United States Patent [19]

Faghri

[11] Patent Number: 5,225,812
[45] Date of Patent: Jul. 6, 1993

[54] PROTECTIVE COMPOSITE LINER

[75] Inventor: Amir Faghri, Dayton, Ohio

[73] Assignee: Wright State University, Dayton, Ohio

[21] Appl. No.: 707,777

[22] Filed: May 30, 1991

[51] Int. Cl.5 ............................................. G08B 21/00
[52] U.S. Cl. .................................... 340/605; 340/603; 73/49.2; 220/461; 220/900; 114/74 R; 114/228
[58] Field of Search ..................... 340/604, 605, 603; 73/49.2; 220/461, 562, 900; 114/227, 228, 74 R

[56] References Cited

U.S. PATENT DOCUMENTS

| 3,252,155 | 5/1966 | Surtees et al. ........... 340/605 X |
| 4,738,893 | 4/1988 | Grillo ..................... 428/252 |
| 4,947,785 | 8/1990 | Milne ..................... 114/357 |
| 5,009,179 | 4/1991 | Johnson ................... 114/229 |
| 5,009,180 | 4/1991 | Holt ...................... 114/229 |
| 5,038,960 | 8/1991 | Seery ..................... 220/461 X |
| 5,072,623 | 12/1991 | Hendershot ............... 340/49.2 |
| 5,109,202 | 4/1992 | Akiba ..................... 340/605 X |
| 5,119,749 | 6/1992 | Velleca et al. ............ 114/74 R |

Primary Examiner—Jin F. Ng
Assistant Examiner—Jeffery A. Hofsass
Attorney, Agent, or Firm—Killworth, Gottman, Hagan & Schaeff

[57] ABSTRACT

A protective composite liner for installation inside a vessel, such as a supertanker, is proposed with an outer layer of high strength fibers, a middle layer of flexible, high strength, resilient film material, and an inner chemical resistant layer. Means for anchoring the protective composite liner and sensor means for detecting a leak are further provided for use with the liner of the present invention.

26 Claims, 6 Drawing Sheets

PROTECTIVE COMPOSITE LINER

BACKGROUND OF THE INVENTION

The present invention relates to the commercial transport of liquids in large vessels, and in particular to a protective composite liner for use in large vessels which is resilient, rupture-resistant and capable of retaining liquids stored therein upon compromise of the vessel structure.

The environmental, economic and health hazards of the trans-oceanic shipment of oil, petroleum products, and other liquids and materials have become even more significant with the use of supertankers capable of causing large-scale environmental damage and economic injury to affected areas in the event of a spill. Ocean-going vessels are exposed to potential rupture from both natural and man-made objects, such as icebergs, undersea formations, shallow seabeds, and submerged wrecks, as well as mines and missiles launched by third-parties. Similar environmental, economic and health hazards are presented by the shipment of oil, petroleum products, chemicals and other substances on railcars, trucks, airplanes, and the like. Despite preventative measures, the rupture and leakage of hazardous materials from such vessels continues to occur, and often the only recourse available has been to control the extent of damage once a rupture has occurred.

Double-hulled vessels have been proposed as a solution to the problem of accidental spills, particularly in ocean-going vessels. However, double-hulled vessels are expensive, as is the conversion of single-hulled vessels to double hulls. Moreover, even with such measures, according to some estimates, spillage may be reduced by only 20 to 50%.

Accordingly, simple and cost-effective means to prevent the spillage of oil, chemicals and other liquids and substances are sought to limit the environmental and health hazards presented by shipment of such liquids in quantity.

SUMMARY OF THE INVENTION

The present invention satisfies the need for a simple cost-effective means to prevent spills of material and liquids from ruptured vessels, such as ocean-going tankers, or other containment means for containing. For simplicity, such containment means will hereafter be referred to as a vessel. In accordance with the present invention a protective composite liner for installation inside a vessel includes an outer layer having high strength fibers, a middle layer of high strength, resilient film material, and an inner layer of chemically resistant or chemically inert material for contact with substances in the vessel.

The high strength fibers of the outer layer may be inorganic, organic, natural or synthetic, but are preferably aromatic polyamide fibers. Aromatic polyamides have a high specific mechanical resistance per unit mass which is five times greater than that of steel, and are capable of absorbing large amounts of kinetic energy. Aromatic polyamide fibers may be woven into fabrics or screens to provide a matrix which absorbs and disperses impact energy throughout the matrix, thus resisting tearing and cutting as well as penetration or perforation by even medium to high energy objects. It is preferred, therefore, that the outer layer comprise one or more layers of a fabric of aromatic polyamide fibers. Further, it is preferred that those fibers be partially, if not completely impregnated with resins, such as polyurethane, polyolefin, polyvinyl chloride, polyepoxide or, preferably, polyester, as a means to provide additional strength and additional material to which the middle layer may be attached. Alternately, the high strength fibers may be high strength metal fibers, wires or belts, such as those of steel or stainless steel, again preferably woven into a flexible mat and impregnated with resin, however, the aromatic polyamides are preferred.

The high strength, resilient film material of the middle layer is preferably comprised of polyvinylbutyral which, desirably, resists penetration, cutting, and tearing, while having significant resilience and flexibility, with greater than 200% elongation possible under stress. These properties further add to the kinetic energy absorption properties of the protective composite liner. The middle layer may include one or more layers of polyvinylbutyral film, and is attached to the outer layer either continuously or intermittently, such as by lamination, bonding, spray coating or with adhesives. The middle layer is, preferably, so attached that under conditions of high stress, such as upon impact of an object on the outer surface of the outer layer, the middle layer may separate or peel from the outer layer as a safeguard. Such separation permits the protective composite liner to advantageously use the flexibility of polyvinylbutyral in cases where high stresses are encountered.

The chemically resistant or chemically inert material of the inner layer is in contact with the materials or liquids carried in vessels in which the protective composite liner is installed. It is understood that use of the term, chemically resistant, encompasses chemically inert materials, and that reference to materials carried in vessels includes reference to liquids which may be carried therein, and vice versa. The composition of the inner layer may vary depending on the application, although its purpose remains. That is, the inner layer serves to provide a non-reactive or chemical resistant barrier between the material therein and the protective middle and outer layers. It is preferred that the inner layer is a film comprised of a fluorocarbon resin such as polytetrafluoroethylene (PTFE), fluorinated ethylene propylene (FEP), perfluoroalkoxy (PFA), or a fluouropolymer known as Tefzel ® which is a modified copolymer of ethylene and tetrafluoroethylene. These materials present a substantially inert, non-reactive barrier. Alternatively, the inner layer may be comprised of polyester elastomer. Polyester elastomer has outstanding resistance to hydrocarbons and petroleum products, high abrasion resistance, and outstanding load bearing capacity, and thus, presents a chemically resistant barrier between the material contained in the protective composite liner and the middle and outer layers. The inner layer is preferably continuously attached to the middle layer, such as by lamination, bonding, extrusion, spray-coating, or may be attached by other known means such as adhesives.

The protective composite liner of the present invention may be either prefabricated in its entirety or fabricated in sections, and the sections seamed in the field in a manner known in the art. To accomplish seaming in the field, the peripheral edges of the outer, middle and inner layers of a section will be provided unbonded, and thus, available for attachment to the edges of corresponding layers in adjacent sections. For example, the outer, middle and inner layers of adjacent sections may be provided with 2, 4 and 6 inch edges which are initially unbonded and extend in stair step fashion. In the field, those edges are placed in side to side relation and the adjacent sections seamed together by known means, for example, by weaving, lamination, bonding, adhesives, and the like. Sections of the protective composite liner may be made in widths compatible with the manner in which the sections are manufactured and thus, may be of various widths, such as 8 to 12 feet wide.

The protective composite liner of the present invention may be attached to the inner surfaces of the vessel, by various means for anchoring, and such means for anchoring the protective composite liner to the vessel inner surfaces may be continuous or, preferably intermittent. It is preferred that the means for anchoring comprises adhesively attaching the outer layer to the inner surface of the vessel at a plurality of connection points. Alternatively, mechanical means for anchoring the protective composite liner to the vessel inner surfaces include one-piece connectors attached both to the protective composite liner and attachable to the vessel, or interlocking mechanical connectors including first and second interlocking elements, one each attached in opposing positions to the protective composite liner and vessel. Use of such alternative connectors may require reinforcement and protection of the protective composite liner, for example with gaskets or flanges, to prevent damage to the protective composite liner where such connectors protrude inward. Such alternative connectors are best suited for use above the material or liquid level to support the protective composite liner along its top edge. Regardless, the means for anchoring are preferably adapted to allow the outer layer (and thus the protective composite liner) to separate from attachment to the vessel as a safeguard upon impact of an object on the outer layer. Thus, the means for anchoring may be frangible or designed to separate at a given stress level.

The protective composite layer further preferably includes sensor means for detecting a leak mounted on at least one of the surfaces of the outer, middle or inner layers. Preferably, where the outer layer is provided without impregnating resin applied thereto, the sensor means are mounted on the outer surface of the middle layer. Where the outer layer is impregnated with resin, however, the sensor means are preferably disposed on the outer surface of the outer layer. Alternately, the sensor means may be disposed on the inner surface of the middle layer or on more than one surface of the outer, middle and inner layers. Although other sensors are possible, the sensor means preferably comprise a plurality of pairs of conductive polymer electrodes bonded or adhered to at least one surface of the outer, middle or inner layers. The voltage drop across the electrodes change when a conductive fluid or material is in contact with the electrodes, allowing a current to pass between the electrodes. Thus, the sensor means for detecting further includes one or more control circuits to apply the voltage, measure the voltage drop across the electrodes and generate a signal related to the voltage drop which indicates the presence of electrically conductive material between the electrodes of each pair. Such sensors may be used to detect the presence of electrically conductive materials, such as sea water or various petroleum products, for example, crude oil.

Alternative embodiments of the protective composite liner of the present invention may include variations of the structure discussed above. For example, in a first alternative embodiment, the outer layer of high strength fibers may be eliminated so that the first, "outer" layer becomes the flexible, high strength, resilient film material of the middle layer, such as one or more layers of polyvinylbutyral, with the inner layer remaining the same. As well, in a second alternative embodiment, the inner layer may be eliminated so that the flexible, high strength, resilient film material of the middle layer becomes the second, inner layer. Or, in a third alternative embodiment, the middle layer may simply be eliminated. Finally, in a fourth alternative embodiment, a protective composite liner may be provided which comprises a first, outer layer of high strength fibers and a second, inner layer including a mixture of flexible, high strength resilient film material and chemically resistant material, such as a mixture of polyvinylbutyral and polyester elastomer.

The vessel inner surfaces may be of any material from which tanks are made and the means for anchoring the protective composite liner of the present invention may be of any material adaptable for use with the tank material and the material of the outer layer. Thus, for example, where steel vessels are employed, means for anchoring may be attached by welding, and where fiberglass tanks are used, means for anchoring may comprise adhesives.

The vessels to which the protective composite liner may be anchored are many and varied, and application of the present invention is of interest wherever potential for rupture of a vessel exists and presents an unacceptable hazard. In ships, the vessel may be the hull of a single-hulled ship, a tank wall within a ship, or a hull of a double-hulled ship. Where installation of the protective composite liner is made in a double-hulled ship, it is preferred to anchor the lining to the inner surface of the outer hull, to provide as much room as possible for the protective composite liner to absorb the kinetic energy of objects which might penetrate the outer hull. Such an application is one in which the second or fourth alternative embodiment may find application, as the need for the chemically resistant or chemically inert inner layer, ordinarily in contact with a material or liquid, is not as needed due to the second hull present in the double-hulled ship. Other vessels in which the protective composite liner may find application include tanks mounted on wheeled chassis, such as railcars, truck tanker trailers, tanker trucks and cars. The protective composite liner of the present invention may also be used in fixed vessels such as tanks installed on supporting structures or foundations, underground tanks, skid mounted tanks, or those used in, or as, cargo containers. The protective lining may also find application in airplanes, both for aircraft tanks as well as for tanker planes used for in-flight refueling.

In use, the high strength fibers of the outer layer are used to absorb the kinetic energy of an object penetrating the vessel. The kinetic energy or shock is absorbed and spread throughout the fiber matrix. If sufficient stress is encountered, the means for anchoring, preferably located intermittently along the inner surface of the vessel, are adapted to permit detachment or separation of the protective composite liner from the vessel surface to permit transverse motion of the protective composite liner which further absorbs and spreads the kinetic energy or shock. Such detachment would, thus, be localized in the area of high stress, so that entire detachment of the protective composite liner and collapse thereof around the material therein would not occur where penetration of the vessel occurs.

In use, the middle layer of flexible, high strength, resilient film material further provides for additional absorption of kinetic energy. Separation of the middle layer from the outer layer is also preferred to provide for cases of high stress, and permit maximum use of the properties of the middle layer in the event the outer layer is restrained or itself breached by rupture of the vessel wall. For example, if an object penetrates the outer layer, the material of the middle layer, preferably, polyvinylbutyral, may separate from the outer layer and elongate more than 200% to absorb the inward projection of the object. Thus, the middle layer can use its flexibility and resiliency to absorb shock, stretch, rebound or deform without bursting if penetration of the outer layer occurs.

Finally, the inner layer, in most applications, will be in contact with the material or liquid container in the vessel, and thus the inner layer is chemically resistant or chemically inert.

In the event that the vessel is breached, or the outer or middle layers are penetrated, sensor means for detecting a leak operate on or between any of the layers of the protective composite liner to detect the presence of a current carrying material in contact with the sensor means. For example, where a ship hull is breached, the sensor means could detect the presence of sea water in contact with the outer layer of the protective composite liner, or if disposed on the middle or inner layer, also detect the presence of sea water in contact with the outer or inner surfaces of the middle or inner layers. Similarly, if rupture of the protective composite liner were to occur, sensors, so placed, could similarly detect the presence of any current carrying material or liquid, such as crude oil, leaking therefrom. Thus, the extent of penetration of an object, damage to the protective composite liner, and the presence of a hazard due to spillage may thereby be readily determined by signals generated from the control circuit.

Accordingly, it is an object of the present invention to provide a protective composite liner for vessels used to transport materials and liquids. It is a further object of the present invention that such protective composite liner includes an outer layer of high strength fibers, a middle layer of flexible, high strength, resilient film material, and an inner layer of chemically resistant material. It is a still further object of the present invention that the protective composite liner include means for anchoring the protective composite liner to a vessel, and further include sensor means for detecting a leak located on any surface of any of the layers.

DETAILED DESCRIPTION OF THE PREFERRED EMBODIMENT

Figure 1:
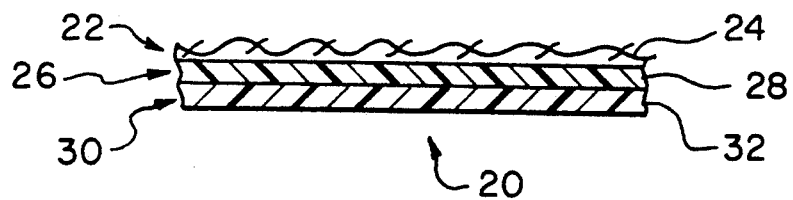
FIG. 1 is a schematic cross-sectional view of the protective composite liner of the present invention.

In accordance with the present invention shown in FIG. 1, a protective composite liner 20 for installation inside a vessel 2 includes an outer layer 22 having high strength fibers 24, a middle layer 26 of flexible, high strength, resilient film material 28, and an inner layer 30 of chemically resistant or chemically inert material 32 for contact with material or liquid 12 in the vessel 2.

Figure 4:
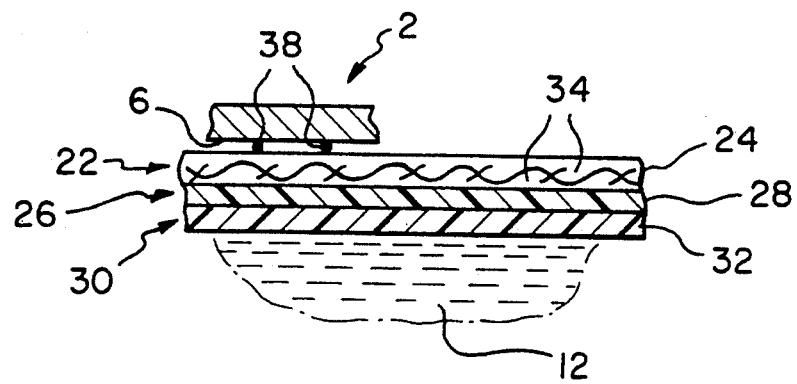
FIG. 4 is a schematic cross-sectional view of the protective composite liner including a resin binder in the outer layer.

The high strength fibers 24 of the outer layer 22 may be inorganic, organic, natural or synthetic, but are preferably aromatic polyamide fibers, such as are known under the trademark Kevlar ®, and available from Du-Pont de Nemours. Aromatic polyamides have a high specific mechanical resistance per unit mass which is five times greater than that of steel, and are capable of absorbing large amounts of kinetic energy. Aromatic polyamide fibers may be woven into fabrics or screens to provide a matrix which absorbs and disperses impact energy throughout the matrix, thus resisting penetration of medium to high energy objects as well as resisting low energy objects and tearing and cutting. Use of the term fabric includes screens and other matrices which may be made of the high strength fibers 24. It is preferred, therefore, that the outer layer 22 comprise at least one layer of a fabric of aromatic polyamide fibers. Further, as shown in FIG. 4, it is preferred that high strength fibers 24 be partially, if not completely impregnated or coated with resin 34, also referred to as binder resins and impregnating resins, such as polyurethane, polyolefin, polyvinyl chloride, polyepoxide or, preferably, polyester, as a means to provide additional strength and additional material to which the middle layer 26 may be attached. Alternatively, outer layer 22 may be comprised of a high strength fiber known under the trademark Spectra ®, available from Monsanto, or the high strength fibers 24 may be made of high strength metal fibers, wires or belts, such as those of steel or stainless steel, again preferably woven into a flexible fabric and impregnated with resin 34. However, the aromatic polyamides are preferred.

Figure 10:
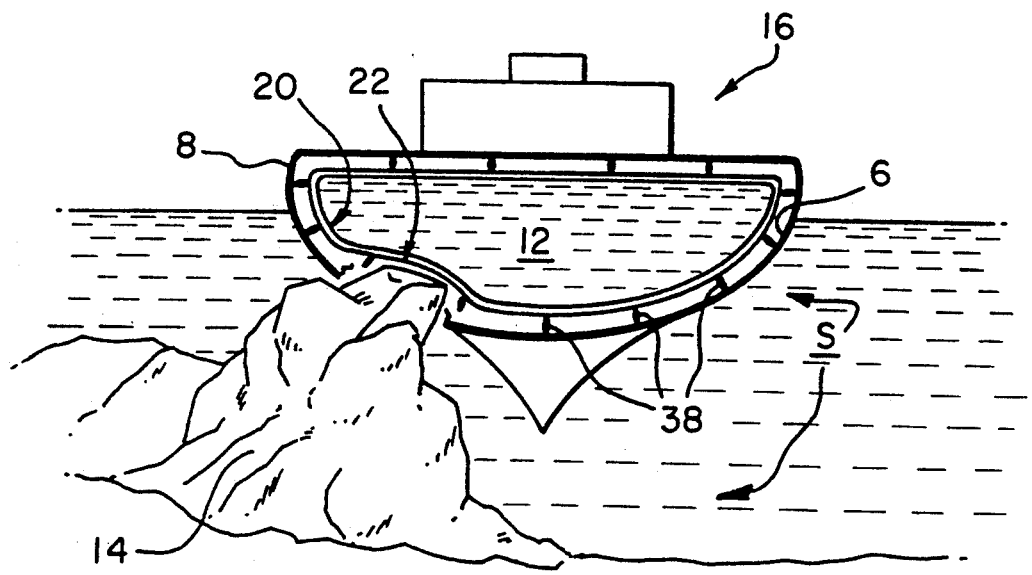
FIG. 10 is a schematic cross-sectional view of a single hull ship incorporating the protective composite liner of the present invention encountering an object which penetrates the vessel.
Figure 11:
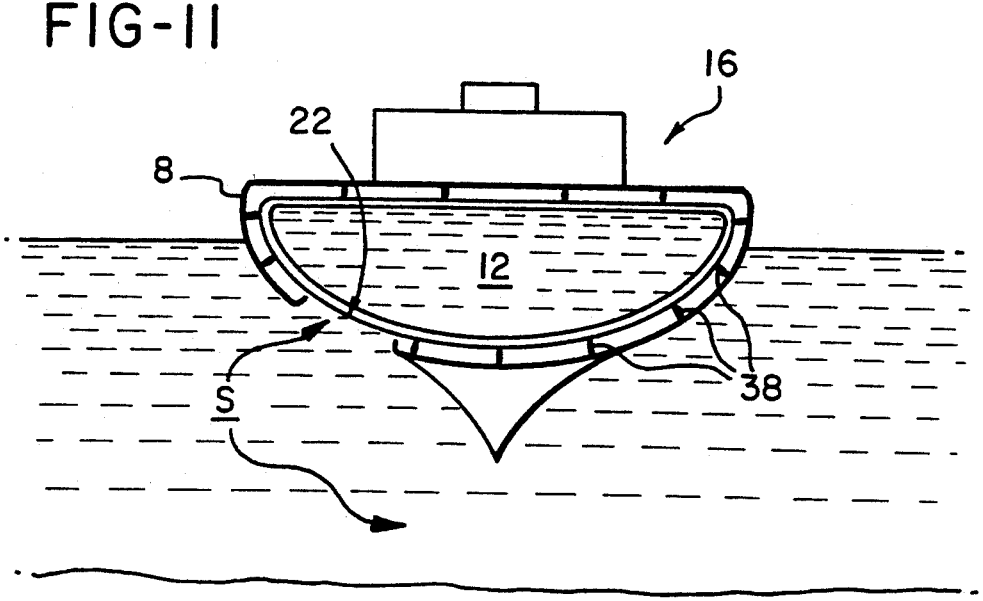
FIG. 11 is a schematic cross-sectional view of the vessel of FIG. 10 after impact with the object.
Figure 12:
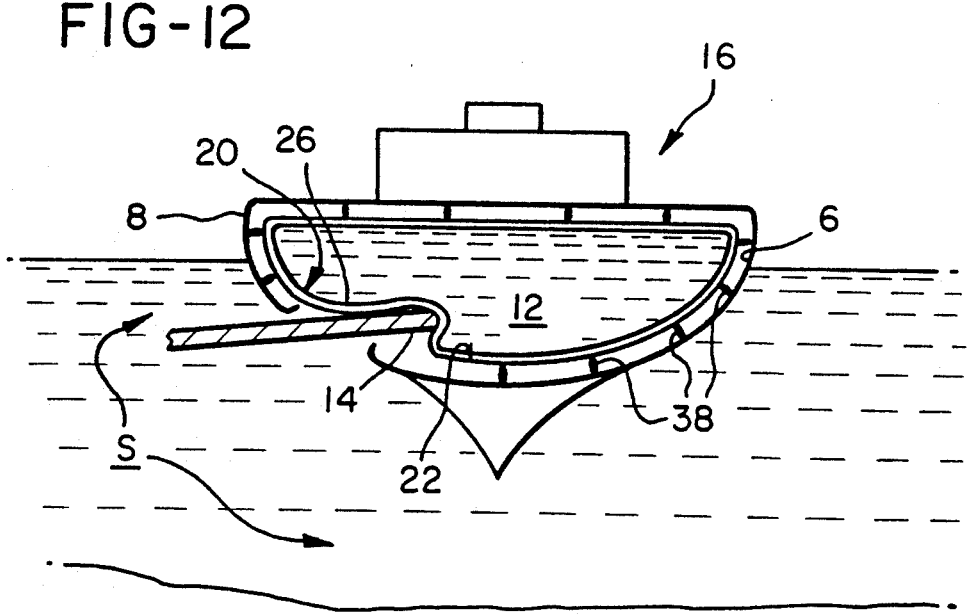
FIG. 12 is a schematic cross-sectional view of a single hull ship incorporating the protective composite liner of the present invention impacted by an object which penetrates the outer layer of the protective composite liner.
Figure 13:
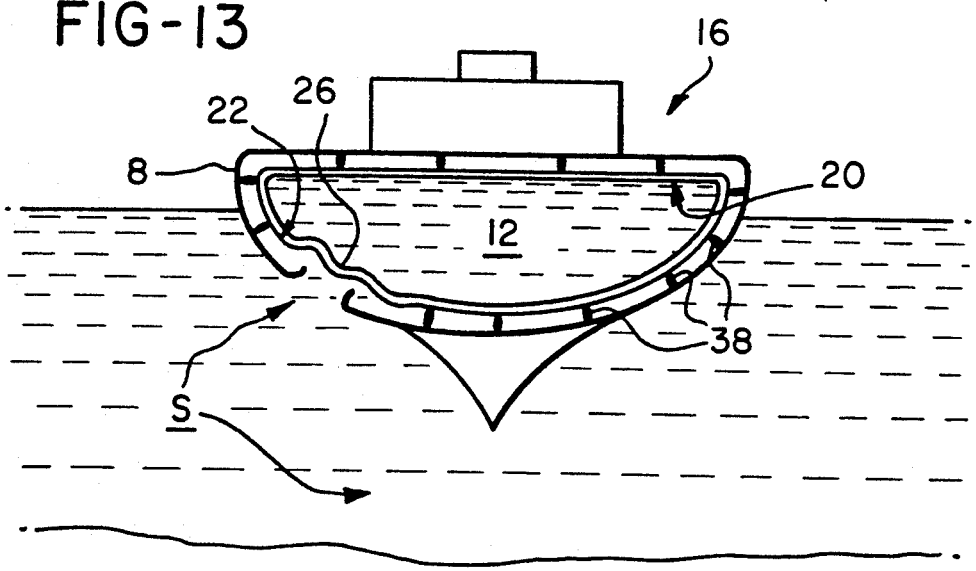
FIG. 13 is a schematic cross-sectional view of the vessel of FIG. 12 after the object has impacted the protective composite liner of the present invention.

The flexible, high strength, resilient film material 28 of the middle layer 26 is preferably comprised of polyvinylbutyral which, desirably, resists penetration, cutting, and tearing, while having significant resilience and flexibility, with greater than 200% elongation possible under stress. These properties further add to the kinetic energy absorption properties of the protective composite liner 20. Polyvinylbutyral is available commercially as Butacite ®, available from DuPont de Nemours, which is preferred, or as Saflex ®, available from Allied Signal. Preferably, the middle layer 26 includes at least one layer of polyvinylbutyral film. Middle layer 26 is attached to the outer layer 22 either continuously or intermittently, such as by physical bonding or chemical bonding, as with adhesives. Preferably, middle layer 26 is attached to outer layer 22 by lamination, however, it is contemplated that other techniques known in the art, such as spray coating, may be used. As shown in FIGS. 10-13, the middle layer 26 is preferably attached so that under conditions of high stress, such as upon impact of an object 14 on the outer surface of the outer layer 22, best shown in FIG. 10, at least a portion of the middle layer 26 may separate from the outer layer 22 as a safeguard. Such separation permits the protective composite liner 20 to use the flexibility of the material of the middle layer 26, such as polyvinylbutyral, in cases where high stresses are encountered, such as when outer layer 22 snags upon object 14, as shown in FIG. 10, or an object 14 penetrates outer layer 22 and continues into vessel 2, as shown in FIG. 12. Despite penetration of vessel 2, protective composite liner 20 prevents spillage of material or liquid 12, as representatively shown in FIGS. 11 and 13.

Figure 2:
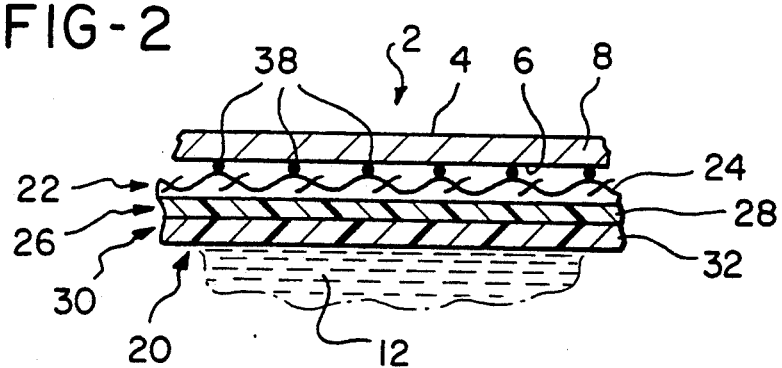
FIG. 2 is a schematic cross-sectional view of the protective composite liner of the present invention attached to the inner surface of a vessel wall.

As representatively shown in FIGS. 2 and 4, the chemically resistant or chemically inert material 32 of the inner layer 30 is in contact with the material or liquid 12 carried in vessel 2 in which the protective composite liner 20 is installed. It is understood that use of the term, chemically resistant material, encompasses chemically inert materials, and that reference to liquids 12 carried in vessel 2 includes reference to materials which may be carried therein, and vice versa. Referring, generally to FIGS. 1-9, the composition of the inner layer 30 may vary depending on the application, although its purpose remains. That is, the inner layer 30 serves to provide a non-reactive or chemical resistant barrier between the material or liquid 12 therein and the middle layer 26 and outer layer 22. It is preferred that the inner layer 30 is a film comprised of a fluorocarbon resin such as polytetrafluoroethylene (PTFE), fluorinated ethylene propylene (FEP), perfluoroalkoxy (PFA), all three of which as are known, for example, under the trademark Teflon ® by DuPont de Nemours, other fluorocarbon resins, or a fluouropolymer known as Tefzel ®, which is a modified copolymer of ethylene and tetrafluoroethylene. Alternatively, inner layer 30 is a film of polyester elastomer, such as that commercially available under the trademark, Hytrel ®. Such polyester elastomer has outstanding resistance to hydrocarbons and petroleum products, high abrasion resistance, and outstanding load bearing capacity. The inner layer 30 is preferably continuously attached to the middle layer 26, such as by lamination, extrusion thereon, spray coating, and bonding, or by other known means, such as adhesives applied either separately or during lamination.

Figure 14:
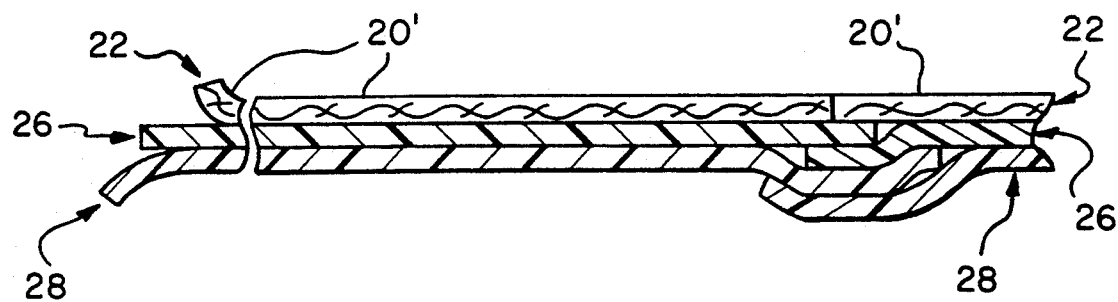
FIG. 14 is a detail cross-sectional view of a seam between sections of the protective composite liner of the present invention.

Referring to FIG. 14, the protective composite liner 20 of the present invention may be either prefabricated in its entirety or fabricated in sections 20′, and the sections 20′ seamed in the field in a manner known in the art. To accomplish seaming in the field, it is preferred that the peripheral edges of the outer, middle and inner layers 22, 26, 30 of a section 20′ are provided unbonded, and thus, available for attachment to the peripheral edges of corresponding layers in an adjacent section 20′. By way of further illustration, the outer, middle and inner layers 22, 26 and 30 of adjacent sections 20′ may be provided with 2, 4 and 6 inch edges which are initially unbonded and extend in stair step fashion. In the field, those edges are placed in side to side relation and the adjacent sections 20′ seamed together by known means, for example, by weaving, lamination, bonding, adhesives, and the like. Sections 20′ of the protective composite liner 20 may be made in widths compatible with the manner in which the sections are manufactured and thus, may be of various widths, and may be, for example, 8 to twelve feet wide.

Figure 8:
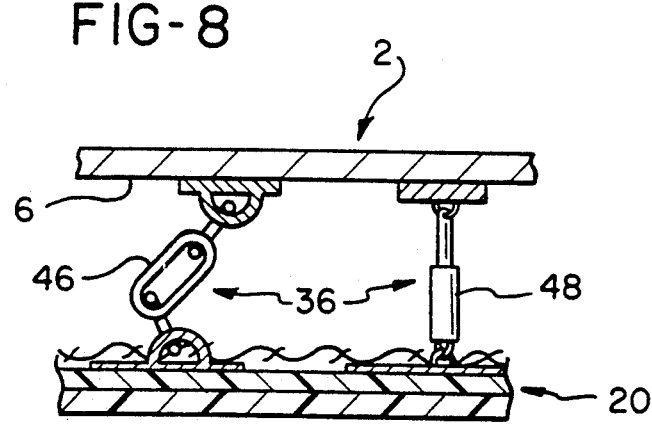
FIG. 8 is a schematic cross-sectional view of alternative means for anchoring the protective composite liner of the present invention to a vessel surface.

As representatively shown in FIGS. 2-4, 7-8, and 10-13, the protective composite liner 20 of the present invention may be attached to the inner surface 6 of the vessel 2 by various means for anchoring 36, and such means for anchoring 36 the protective composite liner 20 to the vessel inner surfaces 6 may be continuous or, preferably intermittent. It is preferred that the means for anchoring 36 comprises adhesively attaching the outer layer 22 to the inner surface 6 of the vessel 2 at a plurality of connection points 38, best shown in FIGS. 2-4. Alternatively, mechanical means for anchoring the protective composite liner 20 to the inner surfaces 6 include a one-piece connector 40, representatively shown in FIG. 7, attached both to the protective composite liner 20 and to the inner surfaces 6, or interlocking mechanical connectors, also representatively shown in FIG. 7, including first and second interlocking elements, 42 and 44 attached respectively in opposing positions to the vessel 2 and protective composite liner 20. As shown in FIG. 8, various other means for anchoring are possible including, representatively, those which provide some slack for motion of protective composite liner 20, such as chains 46, and those which provide some motion attenuation in addition to supporting protective composite liner 20, such as dashpot 48. Use of such alternative connectors may require reinforcement and protection of the protective composite liner 20, for example with gaskets or flanges (not shown), to prevent damage to the protective composite liner 20 where such connectors protrude inward. Significant inward protrusion, particularly of sharp edges, can result in damaging stress on the protective composite liner 20 around the connection points 38 during filling, transport or transfer of material or liquid 12. Minimizing the distance between the wall and the protective composite liner is therefore, preferable, as is adhesive attachment of the outer layer 22 to the inner surface 6 of vessel 2. Alternative connectors are best suited for use above the material or liquid level in the vessel 2 to support the protective composite liner 20 along its top edge. Regardless, the means for anchoring 36 are preferably adapted to allow the outer layer 22 (and thus the protective composite liner 20) to separate from attachment to the vessel 2 as a safeguard upon impact of an object 14 on the outer layer 22. Thus, the means for anchoring 36 may be frangible or designed to separate at a given stress level.

The vessel outer and inner surfaces 4 and 6 may be of any material from which vessel 2 or tanks are made and the means for anchoring 36 of the present invention may be of any material adaptable for use with both the inner surfaces 6 and the outer layer 22. Thus, for example, where vessel 2 is steel, means for anchoring 36 may be attached by welding, and where vessel 2 is a fiberglass tank, means for anchoring 36 may comprise adhesives.

Figure 9:
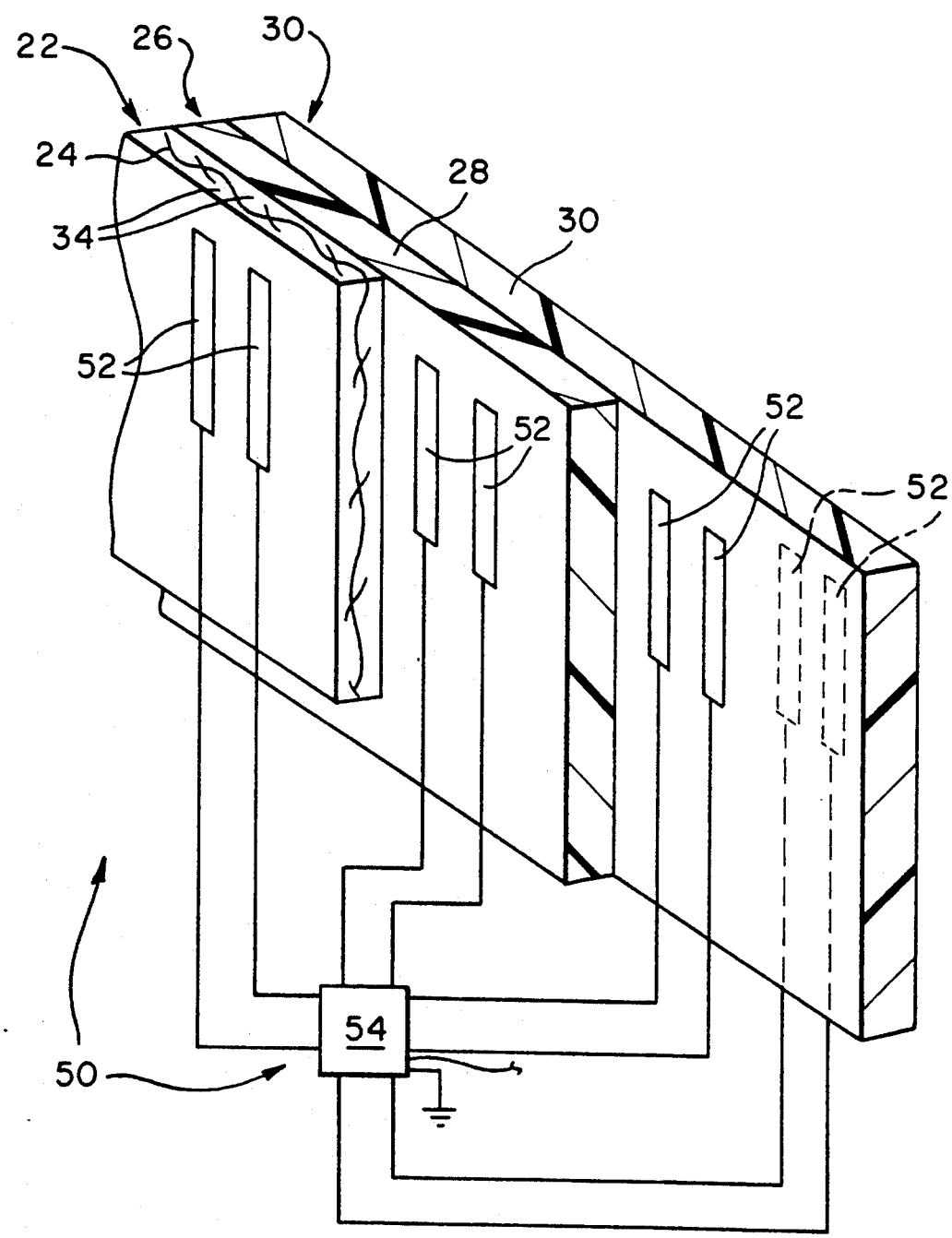
FIG. 9 is a detail schematic perspective view of the sensor means for detecting a leak of the present invention.

Referring now to FIG. 9, the protective composite liner 20 of the present invention further preferably includes sensor means 50 for detecting a leak mounted on at least one of the surfaces of the outer, middle or inner layers, 22, 26, 30. Preferably, where the outer layer 22 is provided without resin 34 applied thereto, as shown in FIG. 1, the sensor means 50 are mounted on the outer surface of the middle layer 26. However, where the outer layer 22 is impregnated with resin 34, as shown in FIG. 9, providing a better surface for attachment and sealing off the openings between high strength fibers 24, the sensor means 50 are preferably disposed on the outer surface of the outer layer 22. Alternately, the sensor means 50 may be disposed on the inner surface of the middle layer 26 or on more than one surface of the outer, middle and inner layers 22, 26, and 30. The sensor means 50 preferably comprise a plurality of pairs of electrodes 52, which may be conductive polymeric electrodes, such as are available from Raychem, Menlo Park, Calif. The voltage drop across the electrodes 52 changes when a conductive fluid or material, such as sea water or crude oil, is in contact with the electrodes 52, allowing a current to pass between the electrodes 52. Thus, the sensor means 50 further includes one or more control circuits 54 to apply the voltage, measure the voltage drop across the electrodes 52 and generate a signal related to the voltage drop which indicates the presence of electrically conductive material between the electrodes 52 of each pair. Sensor means 50 and control circuits 54 are connected to a source of electricity (not shown). When disposed on a surface of protective composite liner 20, a plurality of electrodes 52 are provided to generate a plurality of signals from various points along the surface. Thus, should vessel 2 or one or more layers of protective composite liner 20 be breached, the point of damage may be determined with control circuits 54 from localized changes in signals from electrodes 52.

Figure 5:
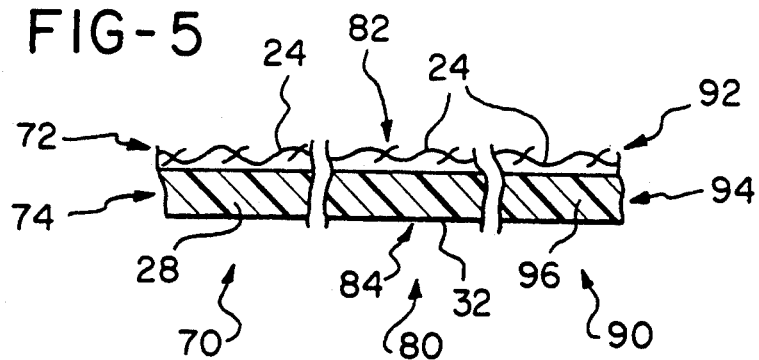
FIG. 5 is a schematic cross-sectional view of alternative embodiments of the present invention.
Figure 6:
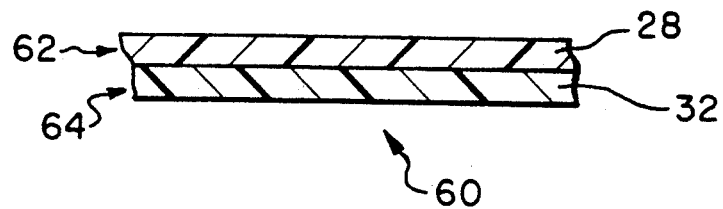
FIG. 6 is a schematic cross-sectional view of an alternative embodiment of the present invention.
Figure 7:
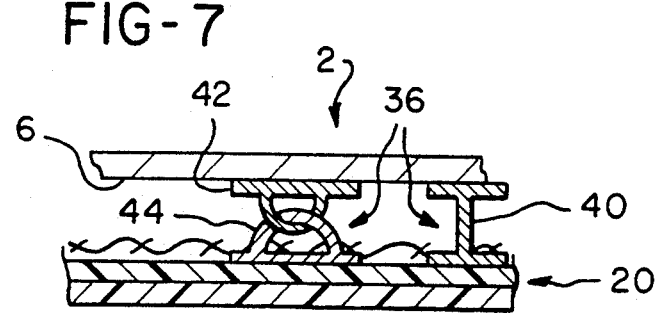
FIG. 7 is a schematic cross-sectional view of alternative means for anchoring the protective composite liner of the present invention to a vessel surface.

Alternative embodiments of the protective composite liner 20 of the present invention are shown in FIGS. 5 and 6, and may include variations of the structure discussed above. For example, in a first alternative embodiment 60 shown in FIG. 6, the outer layer 22 of high strength fibers 24 may be eliminated so that the first, outer layer 62 becomes the flexible, high strength, resilient film material 28, such as one or more layers of polyvinylbutyral, with the inner layer 64 remaining the same. As well, in a second alternative embodiment 70 shown in FIG. 5, the first, outer layer 72 remains the same while the chemically resistant or chemically inert material 32 is eliminated so that the flexible, high strength, resilient film material 28 becomes the second, inner layer 74. Or, in a third alternative embodiment 80 also shown in FIG. 5, the middle layer 26 may simply be eliminated, leaving the high strength fibers 24 in the outer layer 82 and the chemically resistant or chemically inert material 32 in the inner layer 84. Finally, in a fourth alternative embodiment 90 shown in FIG. 5, a protective composite liner 20 may be provided which comprises a first, outer layer 92 of high strength fibers 24 and a second, inner layer 94 including a mixture 96 of flexible, high strength resilient film material 28 and chemically resistant or chemically inert material 32, such as a mixture of polyvinylbutyral and a fluorocarbon resin or polyester elastomer.

The vessels 2 to which the protective composite liner 20 of the present invention may be anchored are many and varied, and application of the present invention is of interest wherever potential for rupture of a vessel 2 exists and presents an unacceptable hazard. Typical vessels 2 in which the protective composite liner 20 may find application include single and double hulled ships 16 and 18, respectively. As well, the protective composite liner 20 may be used in tanks mounted on wheeled chassis, such as railcars, truck tanker trailers, tanker trucks and cars. The protective composite liner 20 of the present invention may also be used in fixed tanks such as those installed on supporting structures or foundations, underground tanks, skid mounted tanks, or those used in or as cargo containers. The protective composite liner 20 may also find application in airplanes, both for aircraft tanks as well as for tanker planes used for in-flight refueling.

Figure 3:
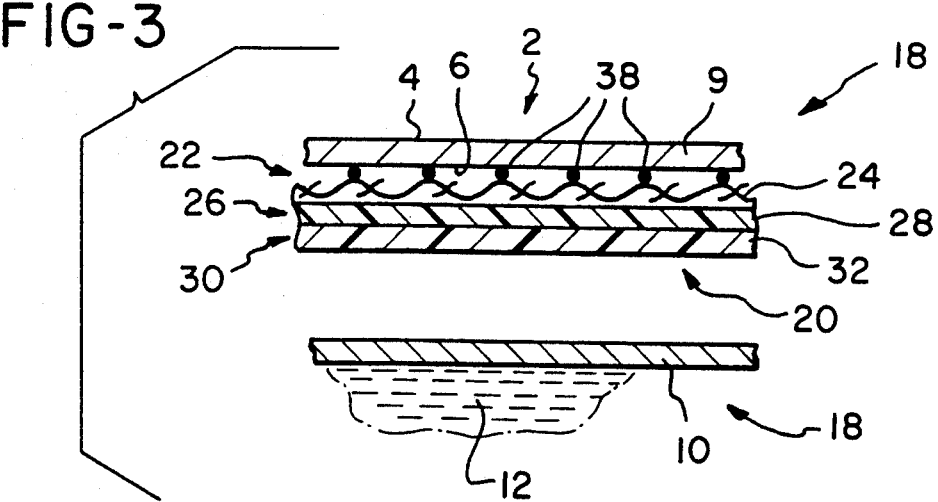
FIG. 3 is a schematic cross-sectional view of the protective composite liner of the present invention attached to the outer vessel wall of a double-walled vessel.

In FIGS. 2 and 10-13, the protective composite liner 20 is representatively shown installed in the hull 8 of a single-hulled ship 16, and could in like manner be installed on a tank wall within a ship (not shown). In FIG. 3 the protective composite liner 20 is installed on the outer hull 9 of a double-hulled ship 18. Alternately, the protective composite liner 20 could be attached to the inner surface of inner hull 10. However, where installation of the protective composite liner 20 is made in a double-hulled ship 18, it is preferred to anchor the protective composite liner 20 to the inner surface 6 of the outer hull 9, to provide as much room as possible for the protective composite liner 20 to absorb the kinetic energy of object 14 which might penetrate the outer hull 9. Use of the protective composite liner 20 in a double-hulled ship 18 is one application in which the second or fourth alternative embodiments 70 or 90, shown in FIG. 5, may find application, as the need for the chemically resistant or chemically inert inner layer 30, ordinarily in contact with a material or liquid 12, is not needed due to the presence of inner hull 10 in a double-hulled ship 18.

As further shown in FIGS. 10-13, in use, the high strength fibers 24 of the outer layer 22 are used to absorb the kinetic energy of an object 14 penetrating the vessel 2. The kinetic energy or shock is absorbed and spread throughout the fiber matrix. If sufficient stress is encountered, the means for anchoring 36, preferably located intermittently along the inner surface of the vessel, are adapted to permit detachment or separation of the protective composite liner 20 from the inner surface 6, as shown in FIG. 10, to permit transverse motion of the protective composite liner 20 which further absorbs and spreads the kinetic energy or shock. Such detachment would, thus, be localized in the area of high stress, so that entire detachment of the protective composite liner 20 and collapse thereof around the material or liquid 12 therein would not occur where a penetration of the vessel 2 occurs.

In use, the middle layer 26 of flexible, high strength, resilient film material 28 further provides for additional absorption of kinetic energy. As representatively shown in FIG. 12, separation of the middle layer 26 from the outer layer 22 is also preferred to provide for cases of high stress, and permit maximum use of the properties of the middle layer 26 in the event the outer layer 22 is restrained or itself breached by rupture of the vessel 2. For example, if an object 14 penetrates the outer layer 22 as shown in FIG. 12, the material of the middle layer 26, preferably, polyvinylbutyral, may separate from the outer layer 22 and elongate more than 200% to absorb the inward projection of the object 14, or to provide slippage between the outer layer 22 and middle layer 26 where the former is snagged by an object 14 as may occur in situations such as shown in FIG. 10. Thus, the middle layer 26 can use its flexibility and resiliency to absorb shock, stretch, rebound or deform without bursting if penetration of the outer layer 22 occurs.

Finally, in use, the inner layer 30, in most applications, will be in contact with the material or liquid 12 contained in the vessel 2, as shown in FIGS. 2, 4, and 10-13, and thus the inner layer 30 is preferably chemically resistant or chemically inert.

In the event that the vessel 2 is breached, or the outer or middle layers 22 or 26 are penetrated, as shown in FIGS. 10-13, electrodes 50 of sensor means for detecting a leak, provided on or between any of the layers 22, 26, 30, operate to detect the presence of a current carrying material in contact with the electrodes 52. As further seen in FIG. 9, for example, where a ship hull 8 is breached, the electrodes 52 could detect the presence of sea water S in contact with the outer layer 22 of the protective composite liner 20, or if disposed on the middle or inner layers 26 or 30, also detect the presence of sea water S in contact with the surfaces of the middle or inner layers 26 or 30. Similarly, if an electrically conductive material or liquid 12 is contained within protective composite liner 20, for example crude oil, electrodes 52 could detect the presence of such material or liquid 12 in the event of damage to the protective composite liner 20 due to internal as well as external forces. Thus, in cooperation with control circuits 54, the extent of penetration of an object 14, damage to the protective composite liner 20, and the presence of a hazard due to spillage may thereby be readily determined.

While certain representative embodiments and details have been shown for purposes of illustrating the present invention, it will be apparent to those skilled in the art that various changes in the articles disclosed herein may be made without departing from the scope of the invention, which is defined in the appended claims.

What is claimed is:

1. A protective composite liner for containing a liquid or material in a vessel, said protective composite liner comprising a flexible structure including:
   an outer layer having one or more layers of high strength fibers;
   a middle layer normally attached to at least a portion of the inner surface of said outer layer, said middle layer having one or more layers of flexible, high strength, resilient film material; and
   an inner layer normally attached to at least a portion of the inner surface of said middle layer such that said inner layer is maintained in substantially opposing relationship with said middle layer, said inner layer having one or more layers of chemically resistant or chemically inert material, and adapted for contact with a liquid or material to be placed in contact therewith.

2. The protective composite liner of claim 1 wherein said middle layer is adapted to separate from said outer layer as a safeguard upon impact of an object on the outer surface of said outer layer.

3. The protective composite liner of claim 1 wherein said high strength fibers of said outer layer are interwoven into a fabric.

4. The protective composite liner of claim 1 wherein said high strength fibers of said outer layer are made of a material selected from the group consisting of aromatic polyamide, steel, and stainless steel.

5. The protective composite liner of claim 1 wherein said outer layer further comprises one or more binder resins combined with said high strength fibers.

6. The protective composite liner of claim 5 wherein said one or more binder resins are selected from the group consisting of polyurethane, polyolefin, polyvinyl chloride, polyepoxide and polyester.

7. The protective composite liner of claim 1 wherein said flexible, high strength, resilient film material of said middle layer is comprised of polyvinylbutyral.

8. The protective composite liner of claim 1 wherein said chemically resistant material of said inner layer is comprised of film of polyester elastomer or fluorocarbon resin.

9. The protective composite liner of claim 1 further comprising sensor means for detecting a leak.

10. The protective composite liner of claim 9 wherein said sensor means comprises a plurality of pairs of conductive polymer electrodes disposed on at least one surface of each of said outer, middle and inner layers, and means for operating said electrodes.

11. The protective composite liner of claim 10 wherein said means for operating comprises one or more control circuits adapted to measure voltage drops across said pairs of electrodes and adapted to generate one or more signals related to said voltage drops which indicate the presence of electrically conductive material between pairs of said electrodes, and wherein said one or more signals indicate the presence, location and extent of leakage.

12. The protective composite liner of claim 1 further comprising means for anchoring said protective composite liner to a vessel inner surface.

13. A containment means for containing liquids or materials comprising:
   a vessel having an inner surface enclosing a space;
   a protective composite liner disposed along at least a portion of said inner surface, said protective composite liner comprising a flexible structure including:
      an outer layer having one or more layers of high strength fibers;
      a middle layer normally attached to at least a portion of the inner surface of said outer layer, said middle layer having one or more layers of flexible, high strength, resilient film material; and
      an inner layer normally attached to at least a portion of the inner surface of said middle layer such that said inner layer is maintained in substantially opposing relationship with said middle layer, said inner layer having one or more layers of chemically resistant or chemically inert material, and adapted for contact with a liquid or material to be placed in contact therewith; and
   means for anchoring said protective composite liner to at least a portion of said inner surface of said vessel.

14. The containment means of claim 13 wherein said means for anchoring anchors said protective composite liner continuously to said inside surface of said vessel.

15. The containment means of claim 13 wherein said means for anchoring anchors said protective composite liner intermittently to said inside surface of the vessel.

16. The containment means of claim 13 wherein said means for anchoring comprises an adhesive.

17. The containment means of claim 15 wherein said means for anchoring comprises a one-piece connector attached to said protective composite liner and adapted for connection to the inner surface of said vessel.

18. The containment means of claim 15 wherein said means for anchoring comprises a mechanical connector including first and second interlocking elements, said first element adapted for mounting on the inner surface of said vessel, and said second element adapted for mounting to said protective composite liner.

19. The containment means of claim 13 wherein said means for anchoring is frangible, adapted to allow said protective composite liner to separate from attachment to said inner surface of said vessel as a safeguard at a pre-determined stress level upon impact of an object on the outer layer of said protective composite liner.

20. The containment means of claim 13 wherein said vessel comprises the hull of a single hulled ship.

21. The containment means of claim 13 wherein said vessel comprises the outer hull of a double-hulled ship.

22. The containment means of claim 13 wherein said vessel comprises the wall of an underground tank.

23. The containment means of claim 13 wherein said vessel comprises the wall of a fixed tank mounted on a support structure.

24. The containment means of claim 13 wherein said vessel comprises the wall of a tank mounted on a wheeled chassis.

25. The containment means of claim 13 wherein said vessel comprises the wall of a tank mounted in an airplane.

26. A protective composite liner for containing a liquid or material in a vessel, said protective composite liner comprising a flexible structure including:
  an outer layer having one or more layers of high strength fibers;
  a middle layer attached to at least a portion of the inner surface of said outer layer, and adapted to separate from said outer surface as a safeguard upon impact of an object on the outer surface of said outer layer, said middle layer having one or more layers of flexible, high strength, resilient film material; and
  an inner layer attached to at least a portion of the inner surface of said middle layer, said inner layer having one or more layers of chemically resistant or chemically inert material, and adapted for contact with a liquid or material to be placed in contact therewith; and
  means for anchoring the protective composite liner to at least a portion of the inner surface of a vessel, wherein said means for anchoring is frangible to allow the protective composite liner to separate from attachment to the inner surface of a vessel at a pre-determined stress level as a safeguard upon impact of an object on the outer layer of the protective composite liner.

* * * * *